United States Patent
Takagai et al.

(10) Patent No.: US 9,341,918 B2
(45) Date of Patent: May 17, 2016

(54) LIQUID CRYSTAL OPTICAL DEVICE AND IMAGE DISPLAY DEVICE

(71) Applicant: KABUSHIKI KAISHA TOSHIBA, Tokyo (JP)

(72) Inventors: Ayako Takagai, Yokosuka Kanagawa (JP); Shinichi Uehara, Suginami Tokyo (JP); Masako Kashiwagi, Yokohama Kanagawa (JP); Masahiro Baba, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 14/477,149

(22) Filed: Sep. 4, 2014

(65) Prior Publication Data
US 2015/0138458 A1 May 21, 2015

(30) Foreign Application Priority Data
Nov. 19, 2013 (JP) .................... 2013-238744

(51) Int. Cl.
G02F 1/1335 (2006.01)
G02F 1/1343 (2006.01)
G02F 1/29 (2006.01)
G02B 27/22 (2006.01)
H04N 13/04 (2006.01)

(52) U.S. Cl.
CPC .............. *G02F 1/29* (2013.01); *G02B 27/2214* (2013.01); *H04N 13/0404* (2013.01); *H04N 13/0452* (2013.01)

(58) Field of Classification Search
CPC ............. G02F 1/134336; G02F 1/133707; G02F 1/1393; G02F 1/134309; G02F 1/134363; G02B 27/2214; G02B 27/26; H04N 13/0404; H04N 13/0434; H04N 13/0409
USPC ............................................ 349/15, 143, 146
See application file for complete search history.

(56) References Cited

U.S. PATENT DOCUMENTS

| | | | |
|---|---|---|---|
| 2013/0258219 A1 | 10/2013 | Takagi et al. | |
| 2014/0063430 A1* | 3/2014 | Kashiwagi | G02B 27/2214 349/139 |
| 2014/0192284 A1 | 7/2014 | Takagi et al. | |
| 2015/0219912 A1* | 8/2015 | Kashiwagi | G02B 27/2214 349/15 |

FOREIGN PATENT DOCUMENTS

| | | |
|---|---|---|
| JP | 5514326 | 4/2014 |
| WO | WO 2013/038557 | 3/2013 |

* cited by examiner

*Primary Examiner* — Mike Qi
(74) *Attorney, Agent, or Firm* — Finnegan, Henderson, Farabow Garrett & Dunner LLP

(57) ABSTRACT

According to one embodiment, a liquid crystal optical device includes an optical unit and a control unit. The optical unit includes a first substrate unit, a second substrate unit, and a liquid crystal layer. The first substrate unit includes a first substrate having a first surface, and first elongated electrodes provided on the first surface. The second substrate unit includes a second substrate having a second surface opposing the first surface, first opposing electrodes provided between the first and second substrates and a second opposing electrode provided between the first and second substrates. The liquid crystal layer is provided between the first and second substrate units. The control unit is electrically connected to the first elongated electrodes, and the first and second opposing electrodes. The control unit implements a first operation of forming a first voltage distribution and a second operation of forming a second voltage distribution.

20 Claims, 6 Drawing Sheets

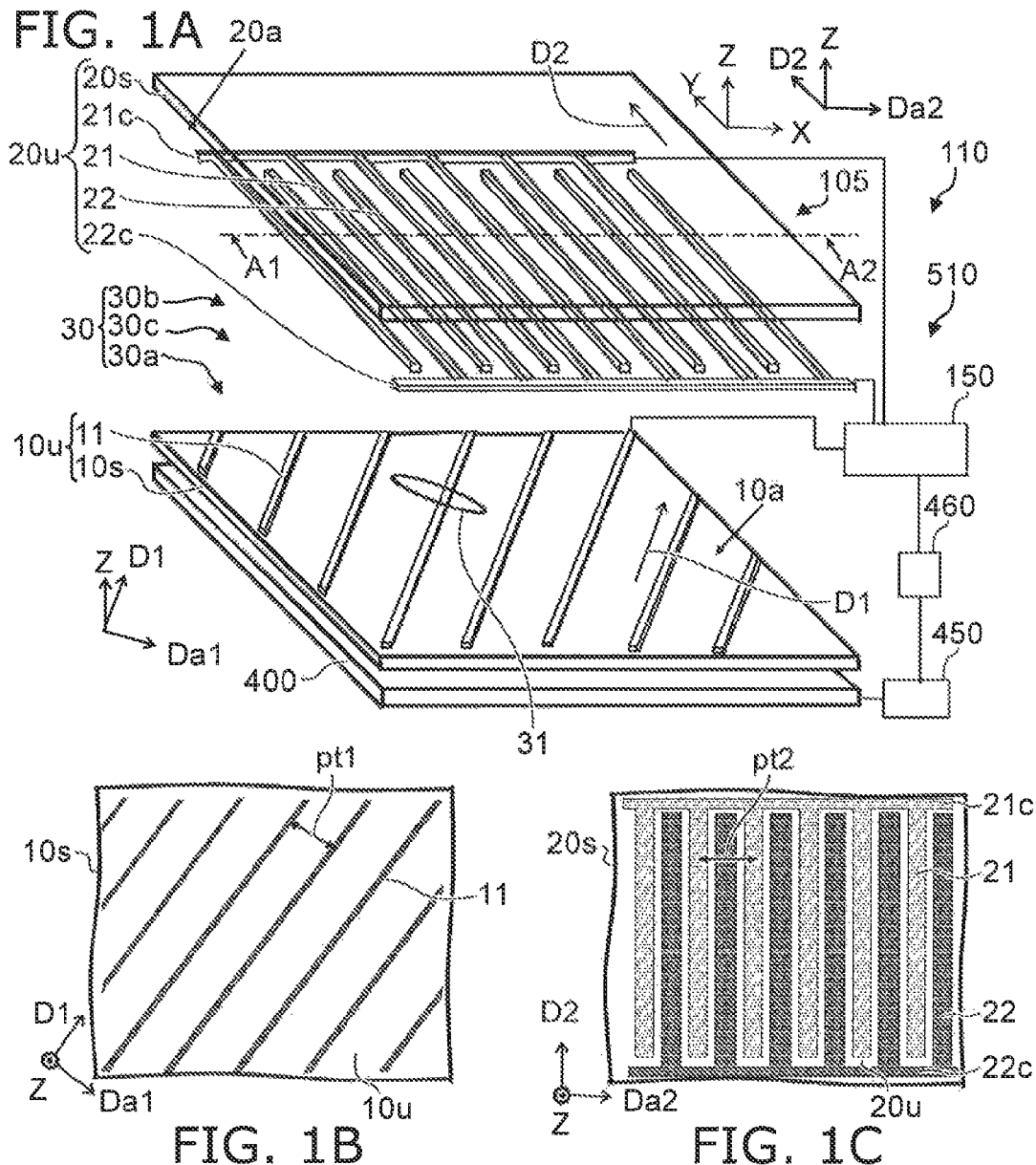
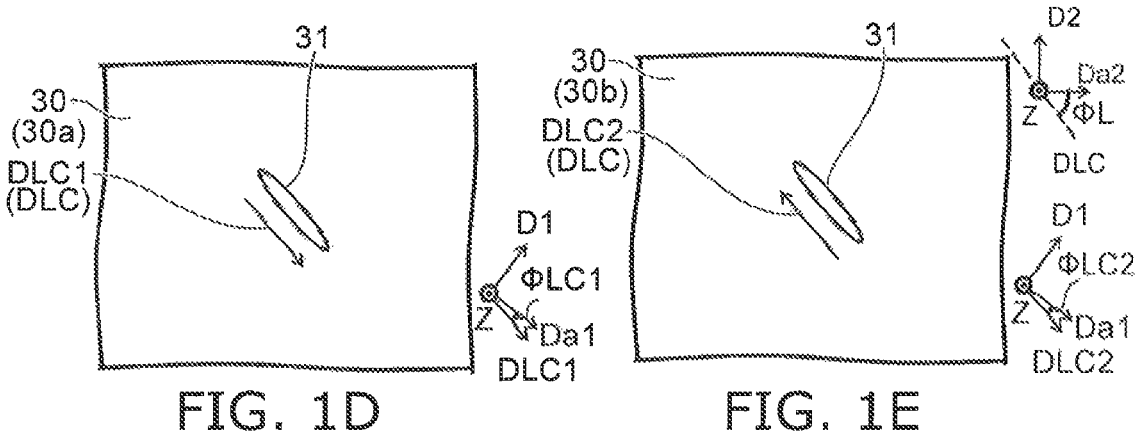

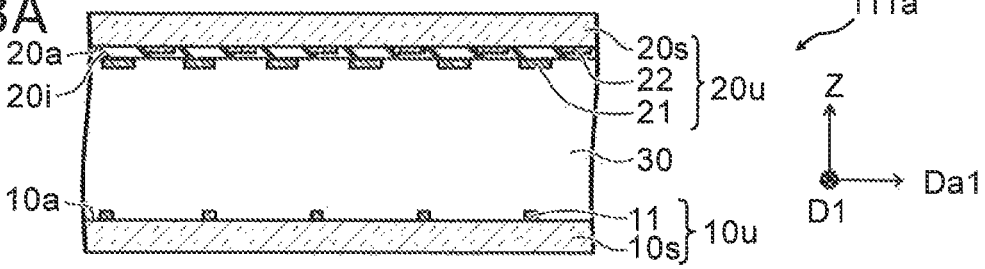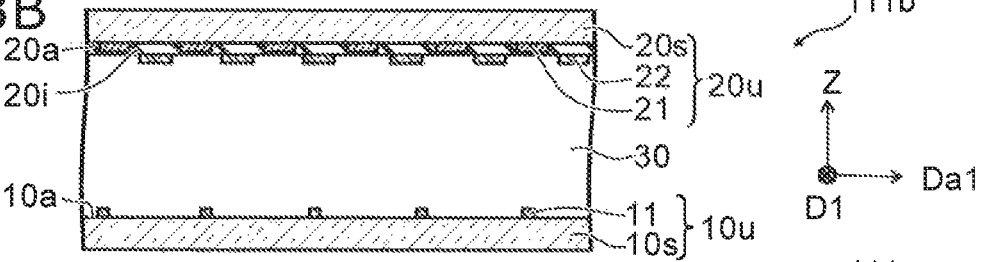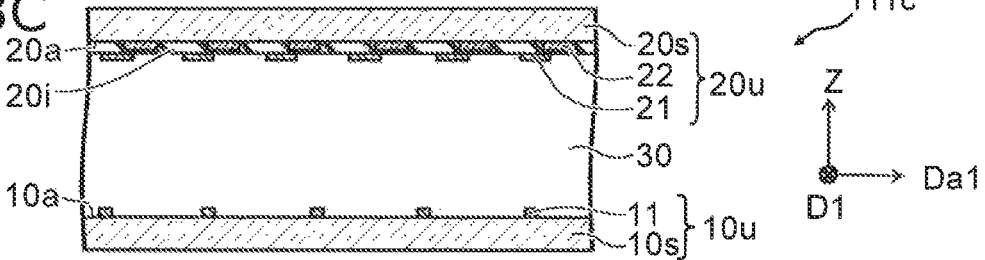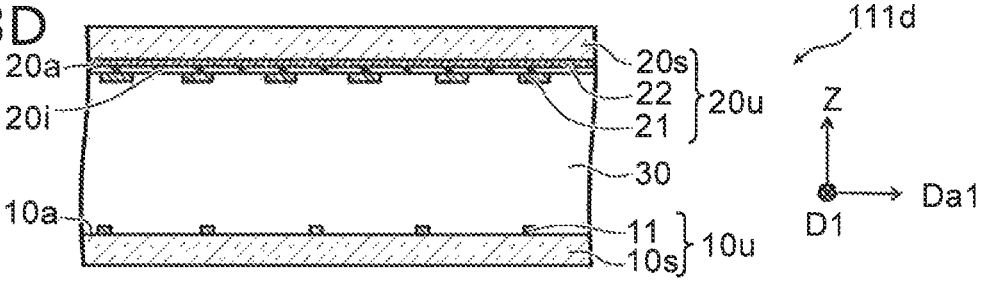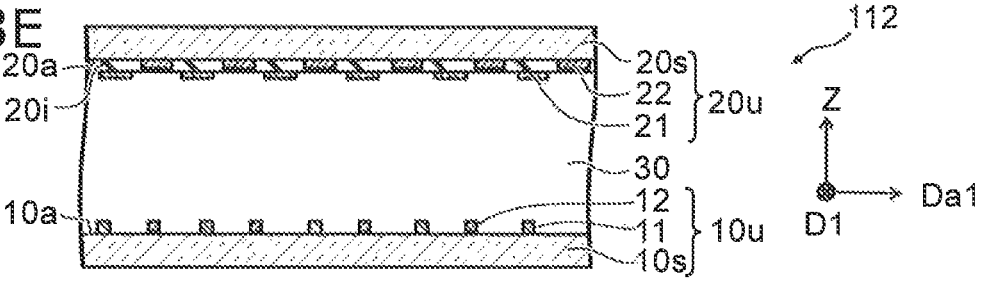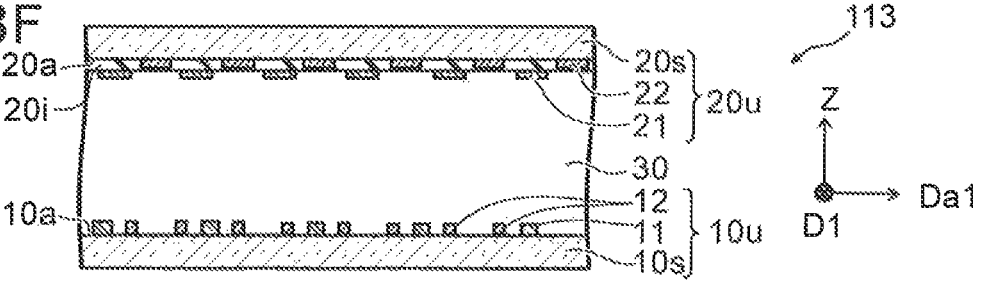

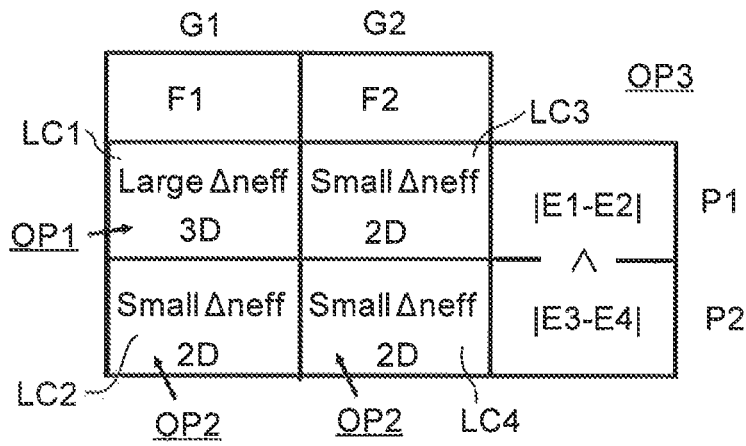
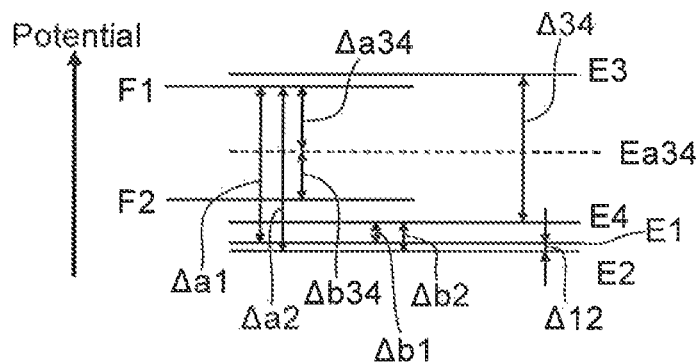
FIG. 5
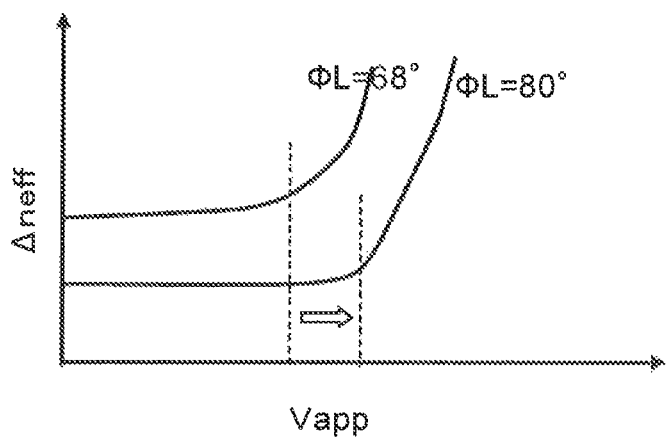
FIG. 6

LIQUID CRYSTAL OPTICAL DEVICE AND IMAGE DISPLAY DEVICE

CROSS-REFERENCE TO RELATED APPLICATIONS

This application is based upon and claims the benefit of priority from Japanese Patent Application No. 2013-238744, filed on Nov. 19, 2013; the entire contents of which are incorporated herein by reference.

FIELD

Embodiments described herein relate generally to a liquid crystal optical device and an image display device.

BACKGROUND

There is a liquid crystal optical device that changes the distribution of the refractive index according to an applied voltage by utilizing the birefringence of a liquid crystal. There is a display device in which such a liquid crystal optical device is combined with an image display unit.

By changing, for example, the distribution of the refractive index of the liquid crystal optical device, such an image display device switches between a state in which the image displayed by the image display unit is caused to be incident on the eyes of a viewer as displayed by the image display unit and a state in which the image displayed by the image display unit is caused to be incident on the eyes of the viewer as multiple parallax images. Thereby, a two-dimensional image display operation and a three-dimensional image display operation are performed, where the three-dimensional image display operation includes stereoscopic viewing with the naked eyes. A liquid crystal optical device and an image display device having higher display quality are desirable. A liquid crystal optical device having good optical characteristics is desirable to realize high display quality.

BRIEF DESCRIPTION OF THE DRAWINGS

FIG. 1A to FIG. 1E are schematic views showing a liquid crystal optical device and an image display device according to a first embodiment;

FIG. 3A to FIG. 3F are schematic cross-sectional views showing other liquid crystal optical devices according to the first embodiment;

FIG. 5 is a schematic view showing the operations of the liquid crystal optical device according to the second embodiment;

FIG. 6 is a graph showing characteristics of the liquid crystal optical device according to the embodiment.

DETAILED DESCRIPTION

Figure 2A:
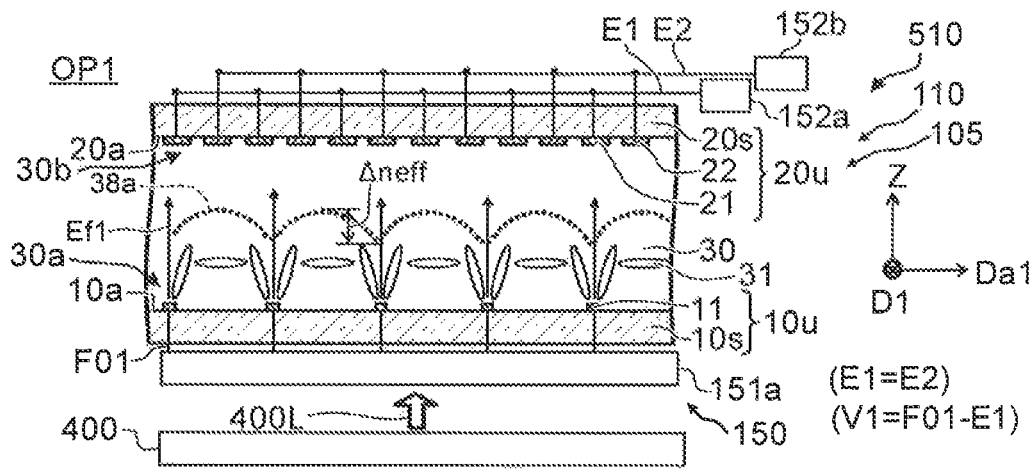
FIG. 2A and FIG. 2B are schematic cross-sectional views showing operations of the liquid crystal optical device and the image display device according to the first embodiment.

According to one embodiment, a liquid crystal optical device includes an optical unit and a control unit. The optical unit includes a first substrate unit, a second substrate unit, and a liquid crystal layer. The first substrate unit includes a first substrate having a first surface, the first substrate being light-transmissive, and a plurality of first elongated electrodes provided on the first surface to extend in a first direction, the plurality of first elongated electrodes being arranged at a first pitch in a first intersecting direction intersecting the first direction. The second substrate unit includes a second substrate having a second surface opposing the first surface, the second substrate being light-transmissive, a plurality of first opposing electrodes provided between the first substrate unit and the second substrate to extend in a second direction, the first opposing electrodes being arranged at a second pitch in a second intersecting direction intersecting the second direction, the second pitch being smaller than the first pitch, and a second opposing electrode provided between the first substrate unit and the second substrate, the second opposing electrode including a portion not overlapping the first opposing electrodes when projected onto a plane parallel to the second surface, at least a portion of each of the plurality of first opposing electrodes not being covered with the second opposing electrode. The liquid crystal layer is provided between the first substrate unit and the second substrate unit, the liquid crystal layer being aligned in an alignment direction intersecting the first direction. The control unit is electrically connected to the first elongated electrodes, the first opposing electrodes, and the second opposing electrode. The control unit implements a first operation of forming a first voltage distribution along the first intersecting direction by applying a first voltage between the first elongated electrodes and the first opposing electrodes, and a second operation of forming a second voltage distribution by applying a second voltage between the first opposing electrodes and the second opposing electrode, a period of voltage fluctuation of the second voltage distribution being shorter than a period of voltage fluctuation of the first voltage distribution.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First embodiment

FIG. 1A to FIG. 1E are schematic views illustrating a liquid crystal optical device and an image display device according to a first embodiment.

FIG. 1A is a schematic perspective view. FIG. 1B to FIG. 1E are schematic plan views.

As shown in FIG. 1A, the image display device 510 according to the embodiment includes the liquid crystal optical device 110 and an image display unit 400.

The liquid crystal optical device 110 includes an optical unit 105 and a control unit 150.

The optical unit 105 includes a first substrate unit 10*u*, a second substrate unit 20*u*, and a liquid crystal layer 30. FIG. 1B illustrates the first substrate unit 10*u*. FIG. 1C illustrates the second substrate unit 20*u*.

The first substrate unit 10*u* includes a first substrate 10*s* and multiple first elongated electrodes 11.

The first substrate 10s has a first surface 10a. The first substrate 10s is light-transmissive. The first elongated electrodes 11 are provided on the first surface 10a.

As shown in FIG. 1B, each of the multiple first elongated electrodes 11 extends in a first direction D1. The multiple first elongated electrodes 11 are arranged in a first intersecting direction Da1 at a first pitch pt1. The first intersecting direction Da1 intersects the first direction D1. Hereinbelow, the first intersecting direction Da1 is taken to be perpendicular to the first direction D1. The first pitch pt1 is the length along the first intersecting direction Da1 between the centers in the first intersecting direction Da1 of two mutually-adjacent first elongated electrodes 11.

As shown in FIG. 1A, the second substrate unit 20u includes a second substrate 20s, multiple first opposing electrodes 21, and multiple second opposing electrodes 22.

The second substrate 20s has a second surface 20a. The second surface 20a opposes the first surface 10a. The second substrate 20s is light-transmissive.

As shown in FIG. 1C, the multiple first opposing electrodes 21 are provided between the first substrate unit 10u and the second substrate 20s. Each of the multiple first opposing electrodes 21 extends in a second direction D2. The multiple first opposing electrodes 21 are arranged in a second intersecting direction Da2 at a second pitch pt2. The second intersecting direction Da2 intersects the second direction D2. Hereinbelow, the second intersecting direction Da2 is taken to be perpendicular to the second direction D2. The second pitch pt2 is the length along the second intersecting direction Da2 between the centers in the second intersecting direction Da2 of two mutually-adjacent first opposing electrodes 21.

In the embodiment, the second pitch pt2 is smaller than the first pitch pt1. For example, the second pitch pt2 is not more than 0.25 times the first pitch pt1.

The stacking direction from the first substrate 10s toward the second substrate 20s is taken as a Z-axis direction. One axis perpendicular to the Z-axis direction is taken as an X-axis direction. A direction perpendicular to the Z-axis direction and the X-axis direction is taken as a Y-axis direction.

The first direction D1 and the first intersecting direction Da1 are perpendicular to the Z-axis direction. The second direction D2 and the second intersecting direction Da2 are perpendicular to the Z-axis direction. The X-Y plane is perpendicular to the stacking direction from the first substrate 10s toward the second substrate 20s. The second surface 20a is parallel to the X-Y plane.

The second opposing electrodes 22 are provided between the first substrate unit 10u and the second substrate 20s. The second opposing electrodes 22 include a portion not overlapping the first opposing electrodes 21 when projected onto the X-Y plane. At least a portion of each of the multiple first opposing electrodes 21 is not covered with the second opposing electrodes 22.

In the example, one side of the first substrate 10s is aligned with the X-axis direction; and one other side of the first substrate 10s is aligned with the Y-axis direction. One side of the second substrate 20s is aligned with the X-axis direction; and one other side of the second substrate 20s is aligned with the Y-axis direction.

In the example, the first direction D1 and the first intersecting direction Da1 are tilted with respect to the X-axis direction. In the example, the second direction D2 is aligned with the Y-axis direction; and the second intersecting direction Da2 is aligned with the X-axis direction. The second direction D2 may be tilted with respect to the X-axis direction and the Y-axis direction.

For example, the absolute value of the difference between the first direction D1 and the extension direction of the one side of the first substrate 10s is, for example, not less than 0 degrees and not more than 35 degrees. The absolute value of the difference between the second direction D2 and the extension direction of the one side of the second substrate 20s is, for example, not less than 0 degrees and not more than 80 degrees.

Multiple second opposing electrodes 22 are provided in the example. Each of the multiple second opposing electrodes 22 extends in the second direction D2. The centers of the multiple first opposing electrodes 21 in the second intersecting direction Da2 are arranged alternately along the second intersecting direction Da2 with the centers of the multiple second opposing electrodes 22 in the second intersecting direction Da2.

In the example, the second substrate unit 20u further includes a first opposing electrode connection unit 21c and a second opposing electrode connection unit 22c. For example, the first opposing electrode connection unit 21c connects the ends of each of the multiple first opposing electrodes 21. For example, the second opposing electrode connection unit 22c connects the ends of each of the multiple second opposing electrodes 22. In the example, the multiple first opposing electrodes 21 and the multiple second opposing electrodes 22 have interdigitated configurations (comb teeth configurations).

The liquid crystal layer 30 is provided between the first substrate unit 10u and the second substrate unit 20u. The liquid crystal of the liquid crystal layer 30 is aligned in an alignment direction DLC intersecting the first direction D1.

In the embodiment, the alignment direction DLC may change along, for example, the Z-axis direction.

As shown in FIG. 1A, the liquid crystal layer 30 includes a first substrate-side portion 30a, a second substrate-side portion 30b, and a central portion 30c. The first substrate-side portion 30a is disposed between the first substrate unit 10u and the second substrate unit 20u. The second substrate-side portion 30b is disposed between the first substrate-side portion 30a and the second substrate unit 20u. The central portion 30c is disposed between the first substrate-side portion 30a and the second substrate-side portion 30b.

FIG. 1D illustrates the first substrate-side portion 30a. FIG. 1E illustrates the second substrate-side portion 30b.

An example of the alignment direction (the initial alignment) of the liquid crystal layer 30 will now be described. The initial alignment is the alignment in the state in which a voltage is not applied to the liquid crystal layer 30. Or, the initial alignment is the alignment when the voltage applied to the liquid crystal layer 30 is low (e.g., lower than a substantial threshold voltage). The initial alignment state is determined by, for example, analyzing the optical characteristics of the optical unit 105 using polarized light.

As shown in FIG. 1D, the alignment direction (a first alignment direction DLC1) of the liquid crystal at the first substrate-side portion 30a intersects the first direction D1. For example, the first alignment direction DLC1 is aligned with the first intersecting direction Da1. The absolute value of the angle (a first alignment angle $\phi$LC1) between the first alignment direction DLC1 and a direction (e.g., the first intersecting direction Da1) orthogonal to the first direction D1 is not less than 0 degrees and not more than 10 degrees, e.g., not more than 5 degrees.

As shown in FIG. 1E, the alignment direction (a second alignment direction DLC2) of the liquid crystal at the second substrate-side portion 30b intersects the first direction D1. For example, the second alignment direction DLC2 is aligned with the first intersecting direction Da1. The absolute value of the angle (a second alignment angle $\phi LC2$) between the second alignment direction DLC2 and a direction (e.g., the first intersecting direction Da1) orthogonal to the first direction D1 is not less than 0 degrees and not more than 10 degrees, e.g., not more than 5 degrees.

The first alignment direction DLC1 and the second alignment direction DLC2 each may include, for example, an "orientation;" or an "axis" that does not include an "orientation" may be used as each of the first alignment direction DLC1 and the second alignment direction DLC2.

For example, the first alignment direction DLC1 is substantially parallel to the second alignment direction DLC2. The absolute value of the angle between the first alignment direction DLC1 and the second alignment direction DLC2 is not more than 10 degrees, e.g., not more than 5 degrees. In the embodiment, the absolute value of the angle between the first alignment direction DLC1 and the second alignment direction DLC2 may exceed 10 degrees. When the absolute value of the angle is 0 degrees and the "orientations" of these directions are the same, these directions are "parallel" to each other; and, for example, a "pi cell" or a "pi alignment" is formed. When the absolute value of the angle is 0 degrees and the "orientations" of these directions are opposite, these directions are "antiparallel" to each other; and, for example, a "homogeneous cell" or a "homogeneous alignment" is formed.

As described above, the second direction D2 intersects the first direction D1. The absolute value of the angle between the first direction D1 and the second direction D2 is not less than 5 degrees and not more than 90 degrees. The absolute value of the angle may be 85 degrees or less. The absolute value of the angle may be, for example, not less than 45 degrees and not more than 85 degrees.

The angle between the first alignment direction DLC1 and the second direction D2 is, for example, not less than 5 degrees but less than 90 degrees. The angle may be 85 degrees or less. The angle between the first alignment direction DLC1 and the second intersecting direction Da2 is, for example, not less than 5 degrees and not more than 85 degrees. For example, the absolute value of the angle between the first alignment direction DLC1 and the second intersecting direction Da2 may be, for example, not more than 25 degrees.

The angle between the second alignment direction DLC2 and the second direction D2 is, for example, not less than 5 degrees and not more than 85 degrees. The angle between the second alignment direction DLC2 and the second intersecting direction Da2 is, for example, not less than 5 degrees and not more than 85 degrees.

As described above, at least a portion of each of the multiple first opposing electrodes 21 is not covered with the second opposing electrodes 22. The first opposing electrodes 21 can apply a voltage to the liquid crystal layer 30 independently of the second opposing electrode 22. The second opposing electrodes 22 include portions not overlapping the first opposing electrodes 21 when projected onto the X-Y plane. The second opposing electrodes 22 can apply a voltage to the liquid crystal layer 30 independently of the first opposing electrodes 21.

An electric field that has a component parallel to the X-Y plane (a component perpendicular to the Z-axis direction) occurs when a voltage is applied between the first opposing electrodes 21 and the second opposing electrodes 22. For example, the long-axis direction (the director) of liquid crystal molecules 31 in a region of at least a portion of the liquid crystal layer 30 changes by rotating inside the X-Y plane with respect to the initial alignment when the voltage is applied to the liquid crystal layer 30. In other words, the long-axis direction twists around the Z-axis direction.

At least a portion of the first elongated electrodes 11, the first opposing electrodes 21, and the second opposing electrodes 22 is, for example, light-transmissive.

As shown in FIG. 1A, the control unit 150 is electrically connected to the first elongated electrodes 11, the first opposing electrodes 21, and the second opposing electrodes 22. For example, in the case where the first opposing electrode connection unit 21c is provided, the control unit 150 may be electrically connected to the first opposing electrode connection unit 21c. For example, in the case where the second opposing electrode connection unit 22c is provided, the control unit 150 may be electrically connected to the second opposing electrode connection unit 22c.

In the specification of the application, the state of being electrically connected includes the state in which multiple conductors directly contact each other. The state of being electrically connected includes the state in which multiple conductors are connected to each other via another conductor and a current flows between the multiple conductors. The state of being electrically connected includes the state in which multiple conductors are connected to each other via a switch element (e.g., a transistor, etc.) and a state is formable in which a current flows between the multiple conductors.

Although the control unit 150 is shown as being connected to one of the first elongated electrode 11 for easier viewing of the drawing in FIG. 1A, the control unit 150 is electrically connected to the multiple first elongated electrodes 11.

As shown in FIG. 1A, the image display unit 400 is stacked with the liquid crystal optical device 110 in the image display device 510.

In the specification of the application, the state of being stacked includes not only the state of overlapping in direct contact but also the state of overlapping with a spacing provided therebetween and the state of overlapping with another component inserted therebetween.

As described below, the image display unit 400 causes light including image information to be incident on the optical unit 105. As described below, the liquid crystal optical device 110 functions to control the travel direction of the light.

For example, the image display device 510 includes an image display drive unit 450 for the image display unit 400. A signal is supplied from the image display drive unit 450 to the image display unit 400; and the image display unit 400 emits the light including the image information.

The image display device 510 further includes a central control unit 460. The central control unit 460 controls the control unit 150 and the image display drive unit 450.

An example of operations of the control unit 150 will now be described.

The case will now be described where the dielectric anisotropy of the liquid crystal layer 30 is positive. To simplify the description, the case will be described where the tilt angle (the pretilt angle) of the liquid crystal in the initial alignment is not more than 10 degrees and a substantial threshold voltage substantially exists. The substantial threshold voltage is the minimum applied voltage (effective value) to change the alignment of the liquid crystal. The tilt angle is the angle between the X-Y plane and the long axis of the liquid crystal molecules 31.

Figure 2B:
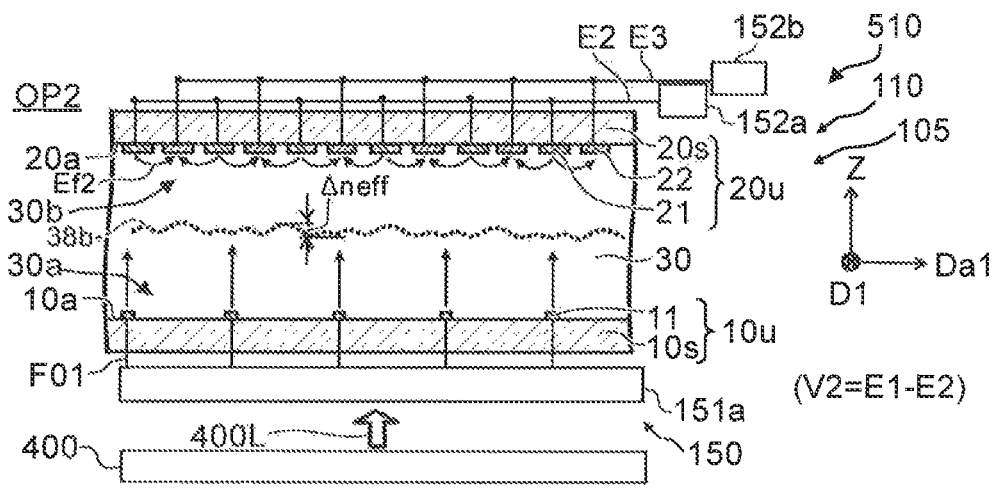

FIG. 2A and FIG. 2B are schematic cross-sectional views illustrating operations of the liquid crystal optical device and the image display device according to the first embodiment.

These drawings illustrate the A1-A2 cross section of FIG. 1A.

FIG. 2A illustrates the state of a first operation OP1. FIG. 2B illustrates the state of a second operation OP2.

As shown in FIG. 2A and FIG. 2B, the first elongated electrodes 11 are connected to a first elongated electrode drive circuit 151a. The first opposing electrodes 21 are connected to a first opposing electrode drive circuit 152a. The second opposing electrodes 22 are connected to a second opposing electrode drive circuit 152b. These circuits are included in the control unit 150.

In the first operation OP1 as shown in FIG. 2A, the control unit 150 applies a first voltage V1 between the first elongated electrodes 11 and the first opposing electrodes 21. Thereby, the control unit 150 forms a first refractive index distribution 38a in the liquid crystal layer 30. The first refractive index distribution 38a is aligned with a direction (e.g., the first intersecting direction Da1) orthogonal to the first direction D1.

For example, the first elongated electrodes 11 are set to have a first elongated electrode potential F01. The first opposing electrodes 21 are set to have a first opposing potential E1. The second opposing electrodes 22 are set to have a second opposing potential E2. In the first operation OP1, for example, the second opposing potential E2 is substantially equal to the first opposing potential E1. The first voltage V1 is the potential difference (i.e., F01−E1) between the first elongated electrode potential F01 and the first opposing potential E1. An electric field (a vertical electric field Ef1) occurs along the Z-axis direction. The effective value of the first voltage V1 is, for example, larger than the substantial threshold voltage of the liquid crystal layer 30. Thereby, the tilt angle of the liquid crystal increases at portions of the liquid crystal layer 30 opposing the first elongated electrodes 11. For example, at the central portion 30c, the tilt angle is, for example, substantially 90 degrees.

On the other hand, the vertical electric field Ef1 does not occur along the Z-axis direction in the liquid crystal layer 30 at the portions between two of the first elongated electrodes 11. Therefore, the alignment of the liquid crystal does not change at these portions. The tilt angle is still, for example, in the initial alignment, e.g., not more than 10 degrees.

Thereby, for example, portions at which the tilt angle is large (the portions opposing the first elongated electrodes 11) and portions at which the tilt angle is small (the portions not opposing the first elongated electrodes 11) are formed along the first intersecting direction Da1. Due to the birefringence of the liquid crystal, portions at which the refractive index is high (the portions opposing the first elongated electrodes 11) and portions at which the refractive index is low (the portions not opposing the first elongated electrodes 11) are formed along the first intersecting direction Da1. The portions at which the refractive index is high and the portions at which the refractive index is low occur periodically and correspond to the positions of the first elongated electrodes 11. In other words, the first refractive index distribution 38a is formed. In the first refractive index distribution 38a, fluctuation Δneff of the refractive index (the difference between the high refractive index and the low refractive index) is large. For example, the refractive index distribution of a lens (e.g., a cylindrical lens) having a band configuration is obtained. The extension direction of the lens having the band configuration is, for example, the first direction D1.

On the other hand, in the second operation OP2 as shown in FIG. 2B, the control unit 150 applies a second voltage V2 between the first opposing electrodes 21 and the second opposing electrodes 22. In other words, the difference between the first opposing potential E1 and the second opposing potential E2 is set to be the second voltage V2. Thereby, a lateral electric field Ef2 is formed inside the liquid crystal layer 30. The lateral electric field Ef2 has a component parallel to the X-Y plane. Thereby, the control unit 150 forms a second refractive index distribution 38b in the liquid crystal layer 30. In the second refractive index distribution 38b, the refractive index of the liquid crystal layer 30 substantially does not fluctuate. Or, the fluctuation (the size of the fluctuation or the fluctuation range) of the refractive index of the liquid crystal layer 30 in the second refractive index distribution 38b is smaller than the fluctuation (the size of the fluctuation or the fluctuation range) of the refractive index of the liquid crystal layer 30 in the first refractive index distribution 38a.

For example, in the second operation OP2, the tilt angle does not increase easily because the lateral electric field Ef2 is formed inside the liquid crystal layer 30 by the first opposing electrodes 21 and the second opposing electrodes 22. A twisting force is applied to the liquid crystal molecules 31 by the lateral electric field Ef2. At this time, the distribution of the lateral electric field Ef2 corresponds to the second pitch pt2 of the first opposing electrodes 21. In other words, the period of the distribution of the lateral electric field Ef2 is smaller than the first pitch pt1 of the first elongated electrodes 11. Therefore, the period of the fluctuation of the refractive index that can occur due to the lateral electric field Ef2 is short. Also, the size of the fluctuation Δneff of the refractive index is small. The period of the fluctuation of the refractive index is shorter in the second refractive index distribution 38b than in the first refractive index distribution 38a. The size of the fluctuation Δneff is smaller in the second refractive index distribution 38b than in the first refractive index distribution 38a. The lens effect is small in the second refractive index distribution 38b.

Thus, in the first operation OP1, the control unit 150 forms the first refractive index distribution 38a having, for example, a cylindrical lens configuration. Then, in the second operation OP2, the control unit 150 forms the second refractive index distribution 38b for which the lens effect is small or the lens effect substantially does not occur.

For example, the potential difference between the first opposing electrodes 21 and the second opposing electrodes 22 in the first operation OP1 is smaller than the potential difference (the second voltage V2) between the first opposing electrodes 21 and the second opposing electrodes 22 in the second operation OP2. In the first operation OP1, a voltage distribution (a change of the voltage) is formed inside the X-Y plane by the first elongated electrodes 11. In the second operation OP2, the voltage distribution (the change of the voltage) is formed by at least the first opposing electrodes 21 and the second opposing electrodes 22. The period (the first pitch pt1) of the voltage distribution formed by the first operation OP1 is longer (larger) than the period (the second pitch pt2) of the voltage distribution formed by the second operation OP2. For example, the period of the voltage fluctuation of the second voltage distribution formed in the second operation OP2 is shorter than the period of the voltage fluctuation of the first voltage distribution formed in the first operation OP1. The first voltage distribution is the fluctuation of the voltage in space (e.g., in the X-Y plane) at one point in time. The period of the fluctuation of the first voltage distribution is the distance between the most proximal positions corresponding to minimum values of the voltage. For example, the period of the fluctuation of the first voltage distribution may be the distance between the most proximal positions corresponding to maximum values of the voltage. The second voltage distribution is the fluctuation of the voltage in space (e.g., in the X-Y plane) at one other point in time. The period of the fluctuation of the second voltage distribution is the distance between the most proximal positions corresponding to minimum values of the voltage. For example, the period of the fluctuation of the second voltage distribution may be the distance between the most proximal positions corresponding to maximum values of the voltage.

As illustrated in FIG. 2A, the image display unit 400 causes light 400L including image information to be incident on the optical unit 105. For example, the image display unit 400 emits the light 400L including multiple parallax images in conjunction with the first operation OP1. The optical unit 105 controls the travel direction of the light 400L by the lens effect based on the first refractive index distribution 38a. Thereby, for example, a viewer can view a three-dimensional image.

On the other hand, the image display unit 400 emits the light 400L including a high definition two-dimensional image in conjunction with the second operation OP2. At this time, the second refractive index distribution 38b for which the fluctuation Δneff of the refractive index is small (or the refractive index is uniform) is formed in the optical unit 105. The light 400L reaches the viewer substantially without the travel direction of the light 400L changing. The viewer can view a high definition two-dimensional image.

The image display operation of the image display unit 400 and the first operation OP1 and the second operation OP2 of the liquid crystal optical device 110 recited above can be implemented by, for example, the central control unit 460 controlling the image display drive unit 450 and the control unit 150.

In the liquid crystal optical device 110 according to the embodiment, the first refractive index distribution 38a and the second refractive index distribution 38b can be implemented by switching between the first refractive index distribution 38a and the second refractive index distribution 38b; and the optical characteristics of the optical unit 105 can be controlled to present images that match the usage by the viewer.

In the second operation OP2, the second refractive index distribution 38b can be controlled by adjusting at least one selected from the potential difference (the second voltage V2) between the first opposing potential E1 and the second opposing potential E2, the potential difference between the first elongated electrode potential F01 and the first opposing potential E1, and the potential difference between the first elongated electrode potential F01 and the second opposing potential E2.

For example, a refractive index distribution having a band configuration may be formed in the second refractive index distribution 38b as well. Then, at this time, the image display unit 400 emits the light 400L including a parallax image. The fluctuation Δneff of the refractive index in the second refractive index distribution 38b is smaller than the fluctuation Δneff of the refractive index in the first refractive index distribution 38a. By using such a refractive index distribution, for example, the three-dimensional image viewing region in the second operation OP2 can be different from the three-dimensional image viewing region in the first operation OP1. A more convenient image display device 510 can be provided by controlling the second refractive index distribution 38b according to the usage by the viewer.

There is a reference example in which the first opposing electrode 21 and the second opposing electrode 22 are integrated in an opposing electrode having a band configuration. In the reference example, the lateral electric field Ef2 does not occur at the second substrate-side portion 30b. Therefore, the refractive index distribution of the liquid crystal layer 30 is controlled using only the vertical electric field Ef1. Therefore, there is a limit to the controllability of the refractive index distribution that is formed.

Conversely, in the embodiment, the controllability of the refractive index distribution that is formed is high because the refractive index distribution is controlled by utilizing the lateral electric field Ef2.

In the reference example recited above, for example, the potential difference between the first elongated electrodes 11 and the opposing electrode is set to 0 to make the refractive index substantially uniform. Then, a prescribed voltage is applied between the first elongated electrodes 11 and the opposing electrode to form the lens. In such a case, the response time of the liquid crystal is relatively long.

On the other hand, in the embodiment, the refractive index can be made substantially uniform in the second operation OP2. In the second operation OP2, potential differences can be formed between the first elongated electrodes 11 and the first opposing electrodes 21 and between the first elongated electrodes 11 and the second opposing electrodes 22 while forming the potential difference between the first opposing electrodes 21 and the second opposing electrodes 22. Therefore, the refractive index can be made substantially uniform in the state in which the voltage is applied to the liquid crystal layer 30. Then, from this state, the first operation OP1 is implemented to form the lens. Thereby, for example, a state having a different refractive index can be formed in a short time. In other words, for example, the response time can be shorter.

FIG. 3A to FIG. 3F are schematic cross-sectional views illustrating other liquid crystal optical devices according to the first embodiment.

These drawings illustrate the liquid crystal optical devices 111a to 111d and 112 according to the embodiment.

In the liquid crystal optical device 111a as shown in FIG. 3A, the second substrate unit 20u further includes a second substrate insulating layer 20i. The second substrate insulating layer 20i is provided between the first opposing electrodes 21 and the second opposing electrodes 22. The second substrate insulating layer 20i electrically insulates the first opposing electrodes 21 from the second opposing electrodes 22. The second substrate insulating layer 20i is light-transmissive. The second substrate insulating layer 20i includes, for example, an oxide, a nitride, an oxynitride, etc. For example, silicon oxide, etc., may be used.

By providing the second substrate insulating layer 20i, the design margins of the first opposing electrodes 21 and the second opposing electrodes 22 increase; and, for example, the design and manufacture of the second substrate unit 20u are easier.

The first opposing electrodes 21 and the second opposing electrodes 22 do not overlap each other in the liquid crystal optical device 111a. In the example, the first opposing electrodes 21 are disposed between the second substrate insulating layer 20i and the liquid crystal layer 30. The second opposing electrodes 22 are disposed between the second substrate insulating layer 20i and the second substrate 20s.

As shown in FIG. 3B, the second substrate insulating layer 20i is provided in the liquid crystal optical device 111b as well. In the example, the second opposing electrodes 22 are disposed between the second substrate insulating layer 20i and the liquid crystal layer 30. The first opposing electrodes 21 are disposed between the second substrate insulating layer 20i and the second substrate 20s.

In the embodiment, the positions of the first opposing electrodes 21 and the positions of the second opposing electrodes 22 may be interchanged.

As shown in FIG. 3C, the second substrate insulating layer 20i is provided in the liquid crystal optical device 111c as well. By providing the second substrate insulating layer 20i, at least a portion of the first opposing electrodes 21 can overlap at least a portion of the second opposing electrodes 22 when projected onto the X-Y plane.

As shown in FIG. 3D, one second opposing electrode 22 is provided in the liquid crystal optical device 111d. In other words, the second opposing electrode 22 is not an electrode having multiple band configurations. The second opposing electrode 22 is disposed between the second substrate 20s and the liquid crystal layer 30; and the second substrate insulating layer 20i is disposed between the second opposing electrode 22 and the liquid crystal layer 30. The first opposing electrodes 21 are disposed between the second substrate insulating layer 20i and the liquid crystal layer 30. In such a case as well, for example, the first opposing electrodes 21 can apply a voltage to the liquid crystal layer 30 independently of the second opposing electrode 22; and the second opposing electrode 22 can apply a voltage to the liquid crystal layer 30 independently of the first opposing electrodes 21. Then, the lateral electric field Ef2 can be formed inside the liquid crystal layer 30; and the operations recited above can be implemented.

In the liquid crystal optical device 112 as shown in FIG. 3E, the first substrate unit 10u further includes multiple second elongated electrodes 12. The multiple second elongated electrodes 12 are provided on the first surface 10a to extend in the first direction D1. For example, at least a portion of the second elongated electrodes 12 may be light-transmissive.

For example, the multiple first opposing electrodes 21 and the multiple second opposing electrodes 22 are arranged alternately along the first intersecting direction Da1.

The control unit 150 is further electrically connected to the second elongated electrodes. For example, in the first operation OP1, the control unit 150 sets the absolute value of the potential difference between the second elongated electrodes 12 and the first opposing electrodes 21 to be less than the absolute value of the potential difference between the first elongated electrodes 11 and the first opposing electrodes 21. Further, for example, in the first operation OP1, the control unit 150 sets the absolute value of the potential difference between the second elongated electrodes 12 and the second opposing electrodes 22 to be less than the absolute value of the potential difference between the first elongated electrodes 11 and the second opposing electrodes 22.

For example, in the first operation OP1, a high voltage is applied to the portions of the liquid crystal layer 30 opposing the first elongated electrodes 11. On the other hand, the voltage that is applied to the portions of the liquid crystal layer 30 opposing the second elongated electrodes 12 is low.

By providing the second elongated electrodes 12, the controllability of the first refractive index distribution 38a improves. For example, the fluctuation Δneff of the refractive index in the first operation OP1 can be increased.

The second elongated electrodes 12 may be provided in any of the liquid crystal optical devices 110 and 111b to 111d.

In the liquid crystal optical device 113 as shown in FIG. 3F, multiple second elongated electrodes 12 are disposed between two most proximal first elongated electrodes 11. The number of the second elongated electrodes 12 provided between the two most proximal first elongated electrodes 11 may be three or more. The potential may be different between the multiple second elongated electrodes 12. By providing the second elongated electrodes 12, the controllability of the first refractive index distribution 38a Improves. For example, the fluctuation range of the refractive index of the first refractive index distribution 38a in the first operation OP1 can be increased by adjusting the potentials of the electrodes. On the other hand, the region where the fluctuation range of the refractive index of the second refractive index distribution 38b in the second operation OP2 is small (or does not fluctuate) can be widened.

Second Embodiment

Figure 4A:
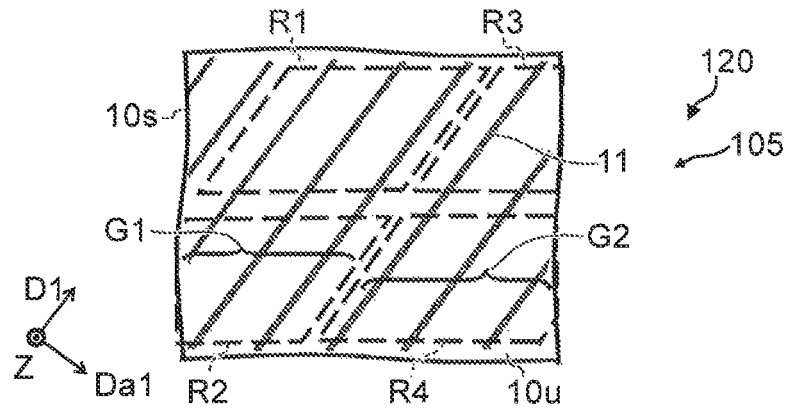
FIG. 4A to FIG. 4C are schematic plan views showing a liquid crystal optical device according to a second embodiment.
Figure 4B:
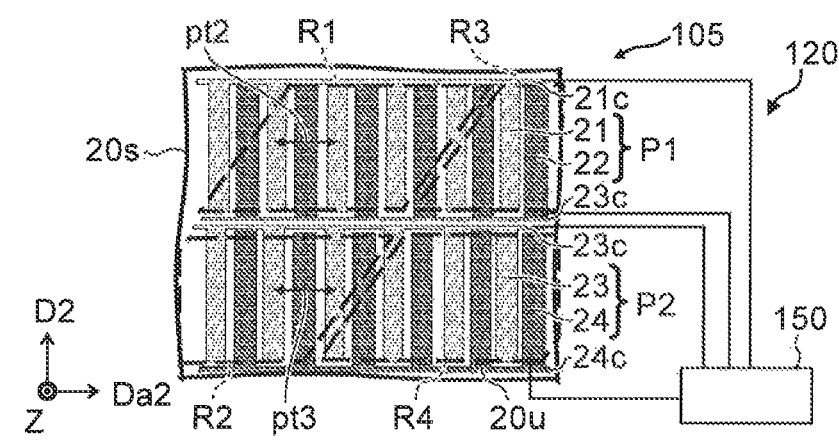
Figure 4C:
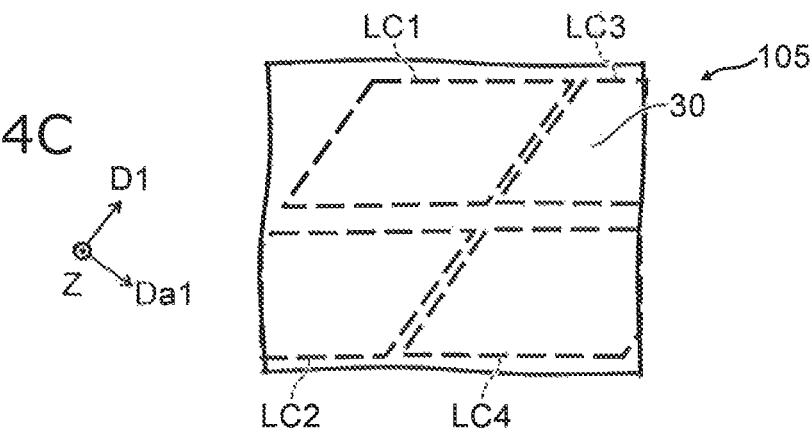

FIG. 4A to FIG. 4C are schematic plan views illustrating a liquid crystal optical device according to a second embodiment.

The liquid crystal optical device 120 according to the embodiment also is applicable to the image display device 510 by being combined with the image display unit 400. Portions of the liquid crystal optical device 120 that are different from those of the liquid crystal optical device 110 will now be described.

As shown in FIG. 4B, the second substrate unit 20u further includes multiple third opposing electrodes 23 and fourth opposing electrodes 24. The first opposing electrodes 21 and the second opposing electrodes 22 are included in first pairs P1. The third opposing electrodes 23 and the fourth opposing electrodes 24 are included in second pairs P2.

The third opposing electrodes 23 are provided between the first substrate unit 10u and the second substrate 20s. The multiple third opposing electrodes 23 are arranged with the first opposing electrodes 21 in the second direction D2. The multiple third opposing electrodes 23 extend in the second direction D2 and are arranged at a third pitch pt3 in the second intersecting direction Da2. The third pitch pt3 is smaller than the first pitch pt1.

The fourth opposing electrodes 24 are provided between the first substrate unit 10u and the second substrate 20s. The fourth opposing electrodes 24 include a portion not overlapping the third opposing electrodes 23 when projected onto the X-Y plane.

At least a portion of each of the multiple third opposing electrodes 23 is not covered with the fourth opposing electrodes 24.

In the example, multiple fourth opposing electrodes 24 are provided. Each of the multiple fourth opposing electrodes 24 extends in the second direction D2. The centers of the multiple third opposing electrodes 23 in the second intersecting direction Da2 and the centers of the multiple fourth opposing electrodes 24 in the second intersecting direction Da2 are arranged alternately along the second intersecting direction Da2.

In the example, the second substrate unit 20u further includes a third opposing electrode connection unit 23c and a fourth opposing electrode connection unit 24c. For example, the third opposing electrode connection unit 23c connects the ends of each of the multiple third opposing electrodes 23. For example, the fourth opposing electrode connection unit 24c connects the ends of each of the multiple fourth opposing electrodes 24. In the example, the multiple third opposing electrodes 23 and the multiple fourth opposing electrodes 24 have interdigitated configurations.

The control unit 150 is further electrically connected to the multiple third opposing electrodes 23 and the fourth opposing electrodes 24.

As shown in FIG. 4A, the multiple first elongated electrodes 11 include a first group G1 and a second group G2. The second group G2 is different from the first group G1. The first group G1 includes a plurality of the first elongated electrodes 11. The second group G2 includes a plurality of the first elongated electrodes 11.

As shown in FIG. 3C, the liquid crystal layer 30 includes first to fourth liquid crystal portions LC1 to LC4. The first liquid crystal portion LC1 is the portion between the first group G1 and the first pairs P1. In other words, the first liquid crystal portion LC1 includes the portion that is between the first group G1 and the first opposing electrodes 21 and between the first group G1 and the second opposing electrodes 22.

The second liquid crystal portion LC2 is the portion between the first group G1 and the second pairs P2. In other words, the second liquid crystal portion LC2 includes the portion that is between the first group G1 and the third opposing electrodes 23 and between the first group G1 and the fourth opposing electrodes 24.

The third liquid crystal portion LC3 is the portion between the second group G2 and the first pairs P1. In other words, the third liquid crystal portion LC3 includes the portion that is between the second group G2 and the first opposing electrodes 21 and between the second group G2 and the second opposing electrodes 22.

The fourth liquid crystal portion LC4 is the portion between the second group G2 and the second pairs P2. In other words, the fourth liquid crystal portion LC4 includes the portion that is between the second group G2 and the third opposing electrodes 23 and between the second group G2 and the fourth opposing electrodes 24.

In other words, as illustrated in FIG. 4A and FIG. 4B, first to fourth regions R1 to R4 are provided in the optical unit 105.

The first region R1 is the portion at which the first group G1 and the first pairs P1 overlap.

The second region R2 is the portion at which the first group G1 and the second pairs P2 overlap.

The third region R3 is the portion at which the second group G2 and the first pairs P1 overlap.

The fourth region R4 is the portion at which the second group G2 and the second pairs P2 overlap.

The first to fourth regions R1 to R4 correspond respectively to the first to fourth liquid crystal portions LC1 to LC4.

An example of the operations of the control unit 150 implemented in such a case will now be described.

FIG. 5 is a schematic view illustrating the operations of the liquid crystal optical device according to the second embodiment.

FIG. 5 illustrates a third operation OP3 that is implemented by the control unit 150 in the embodiment.

As illustrated in FIG. 5, the control unit 150 sets the following potentials.

The first elongated electrodes 11 of the first group G1 are set to have a first group potential F1.

The first elongated electrodes 11 of the second group G2 are set to have a second group potential F2.

The first opposing electrodes 21 are set to have the first opposing potential E1.

The second opposing electrodes 22 are set to have the second opposing potential E2.

The third opposing electrodes 23 are set to have a third opposing potential E3.

The fourth opposing electrodes 24 are set to have a fourth opposing potential E4.

For example, the second group potential F2 is between the first group potential F1 and the first opposing potential E1, between the first group potential F1 and the second opposing potential E2, and between the third opposing potential E3 and the fourth opposing potential E4.

The absolute value of a difference Δ12 between the first opposing potential E1 and the second opposing potential E2 is less than the absolute value of a difference Δ34 between the third opposing potential E3 and the fourth opposing potential E4.

The absolute value of a difference Δa34 between the first group potential F1 and an average potential Ea34 of the third opposing potential E3 and the fourth opposing potential E4 is less than the absolute value of a difference Δa1 between the first group potential F1 and the first opposing potential E1 and less than the absolute value of a difference Δa2 between the first group potential F1 and the second opposing potential E2.

The absolute value of a difference Δb34 between the second group potential F2 and the average potential Ea34 of the third opposing potential E3 and the fourth opposing potential E4 is less than the absolute value of the difference Δa1 between the first group potential F1 and the first opposing potential E1 and less than the absolute value of the difference Δa2 between the first group potential F1 and the second opposing potential E2.

For example, the absolute value of the difference Δ34 between the third opposing potential E3 and the fourth opposing potential E4 is greater than the absolute value of a difference Δb1 between the second group potential F2 and the first opposing potential E1 and greater than the absolute value of a difference Δb2 between the second group potential F2 and the second opposing potential E2.

For example, one selected from the third opposing potential E3 and the fourth opposing potential E4 (in the example, the fourth opposing potential E4) is between the second group potential F2 and the first opposing potential E1 and between the second group potential F2 and the second opposing potential E2.

For example, the first group potential F1 and the second group potential F2 are positioned between the third opposing potential E3 and the fourth opposing potential E4.

For example, the absolute value of the difference Δa1 between the first group potential F1 and the first opposing potential E1 and the absolute value of the difference Δa2 between the first group potential F1 and the second opposing potential E2 are greater than the substantial threshold voltage of the liquid crystal layer 30. The absolute value of the difference Δb1 between the second group potential F2 and the first opposing potential E1 and the absolute value of the difference Δb2 between the second group potential F2 and the second opposing potential E2 are less than the substantial threshold voltage of the liquid crystal layer 30. The absolute value of the difference Δ12 between the first opposing potential E1 and the second opposing potential E2 is less than the substantial threshold voltage of the liquid crystal layer 30. For example, the absolute value of the difference Δa34 and the absolute value of the difference Δb34 are less than the substantial threshold voltage of the liquid crystal layer 30. The absolute value of the difference Δa34 and the absolute value of the difference Δb34 are not more than twice the substantial threshold voltage of the liquid crystal layer 30.

For example, the second opposing potential E2 may be the same as the first opposing potential E1.

For example, the following voltages are employed.

The first group potential F1 is 4 V.
The second group potential F2 is 1 V.
The first opposing potential E1 is 0 V.
The second opposing potential E2 is 0 V.
The third opposing potential E3 is 4.5 V.
The fourth opposing potential E4 is 0.5 V.

In such a case, a relatively high voltage (in the example, 4 V) is applied to the first liquid crystal portion LC1 between the first group G1 and the first pairs P1. Thereby, the first operation OP1 that causes the fluctuation Δneff of the refractive index to occur is implemented.

On the other hand, a relatively low voltage (in the example, 1 V) is applied to the third liquid crystal portion LC3 between the second group G2 and the first pairs P1. Therefore, the fluctuation Δneff of the refractive index in the third liquid crystal portion LC3 is small.

On the other hand, the average voltage of the third opposing potential E3 and the fourth opposing potential E4 of the second pairs P2 is 2.5 V. A voltage of the difference between 4 V and 2.5 V is applied to the second liquid crystal portion LC2 between the first group G1 and the second pairs P2. In other words, a relatively low voltage (in the example, 1.5 V) is applied. In other words, the second operation OP2 is implemented at the second liquid crystal portion LC2.

For example, the average voltage of the third opposing potential E3 and the fourth opposing potential E4 is near the average voltage of the first group potential F1 and the second group potential F2. The absolute value of the difference between these voltages is, for example, not more than twice the absolute value of the difference between the first opposing potential E1 and the second group potential F2. The absolute value of the difference between these voltages is, for example, not more than twice the absolute value of the difference between the second opposing potential E2 and the second group potential F2.

On the other hand, a voltage of the difference between 1 V and 2.5 V is applied to the second liquid crystal portion LC2 between the second group G2 and the second pairs P2. In other words, a relatively low voltage (in the example, 1.5 V) is applied. In other words, the second operation OP2 is implemented at the fourth liquid crystal portion LC4 as well.

Thus, in the third operation OP3, the fluctuation Δneff of the refractive index is obtained in the first region R1 (the first liquid crystal portion LC1). At this portion, for example, a three-dimensional image (3D) can be provided.

On the other hand, the fluctuation Δneff of the refractive index is small or the refractive index is uniform in the second to the fourth regions R2 to R4 (the second to the fourth liquid crystal portions LC2 to LC4). At these portions, for example, a two-dimensional image (2D) can be provided.

For example, the fluctuation Δneff of the refractive index at the first liquid crystal portion LC1 in the third operation OP3 is larger than the fluctuation Δneff of the refractive index at the second liquid crystal portion LC2 in the third operation OP3, larger than the fluctuation Δneff of the refractive index at the third liquid crystal portion LC3 in the third operation OP3, and larger than the fluctuation Δneff of the refractive index at the fourth liquid crystal portion LC4 in the third operation OP3.

Thus, in the liquid crystal optical device 120 according to the embodiment, a stereoscopic image can be provided selectively in the desired region; and a two-dimensional image can be provided in the other regions. The two-dimensional image is high definition.

In the embodiment, by using, for example, the combination (pairs) of the multiple first opposing electrodes 21 and the second opposing electrodes 22 and the combination (pairs) of the multiple third opposing electrodes 23 and the fourth opposing electrodes 24, the lateral electric field Ef2 is applicable to the liquid crystal molecules 31; and the tilt angle of the liquid crystal does not increase easily.

For example, in a reference example in which electrodes having comb teeth configurations are not used (i.e., the lateral electric field Ef2 is not utilized), the alignment of the liquid crystal layer 30 is controlled by the multiple elongated electrodes and the multiple opposing electrodes. In such a case, an unnecessary voltage is applied to the liquid crystal layer 30 by crosstalk occurring between the selected electrodes and the unselected electrodes.

Due to the unnecessary voltage, the alignment of the liquid crystal layer 30 changes; and the refractive index distribution easily becomes an unintended distribution.

Conversely, in the embodiment, the increase of the tilt angle can be suppressed by using the lateral electric field Ef2. In other words, the substantial threshold voltage of the liquid crystal layer 30 with respect to the vertical electric field Ef1 is substantially increased. Thereby, the crosstalk can be suppressed; and the refractive index distribution of the desired state can be formed easily. In other words, the controllability of the refractive index distribution is good.

For example, the third operation OP3 rotates, inside the X-Y plane, the alignment direction of the liquid crystal included in at least part of the portions (the third liquid crystal portion LC3 and the fourth liquid crystal portion LC4) of the liquid crystal layer 30 between the first group G1 and the third opposing electrodes 23 and between the first group G1 and the fourth opposing electrodes 24. Thereby, the crosstalk can be suppressed.

At this time, for example, the light 400L that is emitted from the image display unit 400 to pass through the first liquid crystal portion LC1 displays the three-dimensional image. On the other hand, the light that is emitted from the image display unit 400 to pass through the second, third, and fourth liquid crystal portions LC2 to LC4 displays the two-dimensional image.

Thereby, for example, the three-dimensional image and the two-dimensional image that are provided inside the same screen can be viewed in good states. A liquid crystal optical device having good optical characteristics can be provided; and good images can be provided.

The values of the potentials recited above are examples; and the embodiment is not limited to the examples recited above. For example, various values of the potentials can be employed to create the lateral electric field Ef2 to reduce the fluctuation Δneff of the refractive index distribution. For example, the high/low relationship of the potentials described in regard to FIG. 5 may be interchanged. Further, the high/low relationship of the potentials may be interchanged at a prescribed period to apply an alternating current to the liquid crystal layer 30. For example, common inversion driving may be performed.

Further, in the case where the second substrate insulating layer 20i is provided, there are cases where, for example, a voltage drop due to the second substrate insulating layer 20i occurs. Each of the potentials may be set by considering the voltage drop.

The second elongated electrodes 12 (referring to FIG. 3E) may be further provided in the embodiment. In other words, the first substrate unit 10u may further include the multiple second elongated electrodes 12 provided on the first surface 10a to extend in the first direction D1. The multiple first opposing electrodes 21 and the multiple second opposing electrodes 22 are arranged alternately along the first intersecting direction Da1. In such a case, in the third operation OP3, the absolute value of the potential difference between the second elongated electrodes 12 and the first opposing electrodes 21 is set to be less than the absolute value of the potential difference between the first elongated electrodes 11 and the first opposing electrodes 21. Also, the absolute value of the potential difference between the second elongated electrodes 12 and the second opposing electrodes 22 is set to be less than the absolute value of the potential difference between the first elongated electrodes 11 and the second opposing electrodes 22. In other words, the potential difference between the second elongated electrodes 12 and the first pairs P1 is reduced. Thereby, the controllability of the refractive index distribution that is formed in the liquid crystal layer 30 can be improved.

FIG. 6 is a graph illustrating characteristics of the liquid crystal optical device according to the embodiment.

FIG. 6 illustrates simulation results of the fluctuation Δneff of the refractive index formed in the liquid crystal layer 30. In the example, a voltage of 5 V is applied between the first opposing electrodes 21 and the second opposing electrodes 22; and the voltage that is applied to the first elongated electrodes 11 is changed. The fluctuation Δneff of the refractive index that occurs at this time is determined. The horizontal axis of FIG. 6 is a potential difference Vapp between the first opposing electrodes 21 and the first elongated electrodes 11.

In the example, the first intersecting direction Da1 is perpendicular to the first direction D1; and the second intersecting direction Da2 is perpendicular to the second direction D2. The second alignment direction DLC2 is parallel to the first alignment direction DLC1. An angle φL is the angle between the alignment direction DLC (e.g., the first alignment direction DLC1) and a direction (e.g., the second intersecting direction Da2) perpendicular to the second direction D2. FIG. 6 shows the result of the case where the angle φL is 68 degrees and the case where the angle φL is 80 degrees.

It can be seen from FIG. 6 that, compared to when the angle φL is 60 degrees, the fluctuation Δneff of the refractive index does not change easily when the angle φL is 80 degrees, even when the potential difference Vapp is large. It is considered that this is because the twisting force applied to the liquid crystal molecules 31 is large when the angle φL is 80 degrees.

From this result, in the embodiment, the absolute value of the angle φL between the alignment direction DLC and a direction parallel to the X-Y plane and perpendicular to the second direction D2 is set to be large. For example, the absolute value of the angle φL is greater than the absolute value of the angle between the alignment direction DLC and a direction parallel to the X-Y plane and perpendicular to the first direction D1. The absolute value of the angle φL is, for example, not less than 75 degrees and not more than 90 degrees.

Figure 7A:
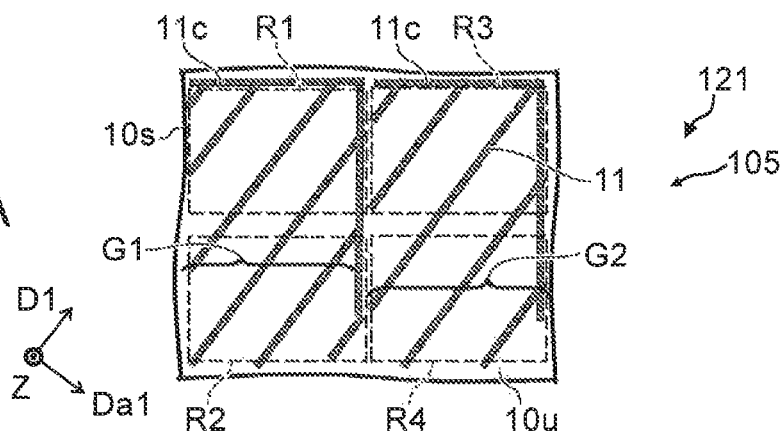
FIG. 7A to FIG. 7C are schematic plan views showing another liquid crystal optical device according to the second embodiment.
Figure 7B:
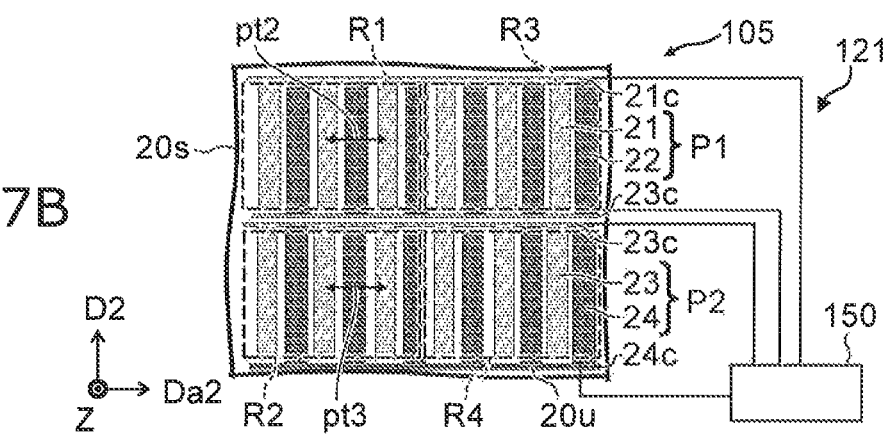
Figure 7C:
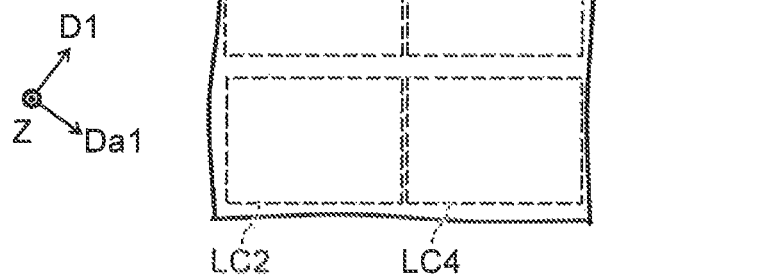

FIG. 7A to FIG. 7C are schematic plan views illustrating another liquid crystal optical device according to the second embodiment.

The liquid crystal optical device 121 according to the embodiment also is applicable to the image display device 510 by being combined with the image display unit 400. Portions of the liquid crystal optical device 121 that are different from those of the liquid crystal optical device 120 will now be described.

As shown in FIG. 7A, in the example, the multiple first elongated electrodes 11 that are included in the first group G1 are connected by a first elongated electrode connection unit 11c. The multiple first elongated electrodes 11 that are included in the second group G2 are connected by a different first elongated electrode connection unit 11c. For example, the ends of the multiple first elongated electrodes 11 included in the second group G2 are positioned at the outer edges of the third region R3 and the fourth region R4. The first to fourth regions R1 to R4 are rectangles.

As shown in FIG. 7B, in the example, the first to fourth regions R1 to R4 are rectangles. As shown in FIG. 7C, in the example, the first to fourth liquid crystal portions LC1 to LC4 are rectangles. In the liquid crystal optical device 121 as well, for example, the operations described in regard to FIG. 5 are applicable.

In the embodiment, the configurations of the first elongated electrodes 11 may be set to match the configurations of the regions. On the other hand, the configurations of the first to fourth opposing electrodes 21 to 24 may be set to match the configurations of the regions.

In the embodiment, it is favorable for the width of each of the multiple first opposing electrodes 21 (or the third opposing electrodes 23) provided in the second substrate unit 20u to be set to be relatively wide and for the space between the electrodes to be set to be relatively narrow. Thereby, for example, a stable vertical electric field Ef1 can be formed between the opposing electrodes and the first elongated electrodes 11. Also, for example, a strong and stable lateral electric field Ef2 can be formed by the first opposing electrodes 21 and the second opposing electrodes 22.

For example, the widths of the second opposing electrodes 22 in the regions not overlapping the first opposing electrodes 21 are set to be relatively wide. Thereby, for example, a stable vertical electric field Ef1 can be formed. Then, a strong, favorable, and stable lateral electric field Ef2 can be formed.

For example, each of the multiple first opposing electrodes 21 has a width in the second intersecting direction Da2 not less than ¼ of the second pitch pt2.

As recited above, in the embodiment, the second pitch pt2 is set to be smaller than the first pitch pt1. For example, the second pitch pt2 is not less than 0.05 times and not more than 0.25 times the first pitch pt1. In the case where the second pitch pt2 is less than 0.05 times the first pitch pt1, the patterning of the electrodes is difficult. In the case where the second pitch pt2 exceeds 0.25 times the first pitch pt1, for example, the period of the lateral electric field Ef2 that is formed becomes excessively large; and the fluctuation Δneff of the refractive index becomes large.

In the embodiment, the first substrate 10s and the second substrate 20s include, for example, transparent glass, a transparent resin, etc.

At least a portion of the first elongated electrodes 11, the second elongated electrodes 12, and the first to fourth opposing electrodes 21 to 24 includes, for example, an oxide including at least one element selected from the group consisting of In, Sn, Zn, and Ti. These electrodes include, for example, ITO (Indium Tin Oxide), etc. These electrodes may include, for example, a thin light-transmissive metal layer.

The liquid crystal layer 30 includes, for example, a nematic liquid crystal. The liquid crystal layer 30 may include a chiral agent. The dielectric anisotropy of the liquid crystal may be positive or negative.

For example, a voltage that causes the optical characteristics of the liquid crystal layer 30 to change by 5% of the difference between the optical characteristics of the liquid crystal layer 30 when a voltage is not applied to the liquid crystal layer 30 and the optical characteristics of the liquid crystal layer when a sufficiently high voltage is applied to the liquid crystal layer 30 may be used as a practical substantial threshold voltage of the liquid crystal layer 30. For example, retardation of the liquid crystal layer 30 is used as the optical change. The retardation corresponds to the product of the thickness of the liquid crystal layer 30 and the effective birefringence of the liquid crystal layer 30. For example, the alignment of the liquid crystal layer 30 changes according to the voltage applied to the liquid crystal layer 30; and as a result, the effective birefringence changes. For example, the optical unit 105 is disposed between two polarizing layers; the voltage (e.g., the voltage between the first elongated electrodes 11 and the first opposing electrodes 21) applied to the liquid crystal layer 30 is changed; the transmittance is measured; and the change of the transmittance (e.g., the difference between the maximum value and minimum value of the transmittance) is measured. Thereby, the change of the retardation for the applied voltage is obtained. For example, 10 volts is used as a sufficiently high voltage. For example, the difference of the retardation between when a voltage of 0 volts is applied to the liquid crystal layer 30 and when the threshold voltage is applied to the liquid crystal layer 30 is 5% of the difference of the retardation between when the applied voltage is 0 volts and when the applied voltage is 10 volts.

According to the embodiments, a liquid crystal optical device and an image display device having good optical characteristics can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the liquid crystal optical device and the image display device such as the optical unit, the substrate unit, the substrate, the electrode, the liquid crystal layer, the control unit, the image display unit, etc., from known art; and such practice is within the scope of the invention to the extent that similar effects can be obtained.

Further, any two or more components of the specific examples may be combined within the extent of technical feasibility and are within the scope of the invention to the extent that the spirit of the invention is included.

Moreover, all liquid crystal optical devices and image display devices practicable by an appropriate design modification by one skilled in the art based on the liquid crystal optical devices and image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical device, comprising:
an optical unit including
 a first substrate unit including
  a first substrate having a first surface, the first substrate being light-transmissive, and
  a plurality of first elongated electrodes provided on the first surface to extend in a first direction, the plurality of first elongated electrodes being arranged at a first pitch in a first intersecting direction intersecting the first direction,
 a second substrate unit including
  a second substrate having a second surface opposing the first surface, the second substrate being light-transmissive,
  a plurality of first opposing electrodes provided between the first substrate unit and the second substrate to extend in a second direction, the first opposing electrodes being arranged at a second pitch in a second intersecting direction intersecting the second direction, the second pitch being smaller than the first pitch, and
  a second opposing electrode provided between the first substrate unit and the second substrate, the second opposing electrode including a portion not overlapping the first opposing electrodes when projected onto a plane parallel to the second surface, at least a portion of each of the plurality of first opposing electrodes not being covered with the second opposing electrode, and
 a liquid crystal layer provided between the first substrate unit and the second substrate unit, the liquid crystal layer being aligned in an alignment direction intersecting the first direction; and
a control unit electrically connected to the first elongated electrodes, the first opposing electrodes, and the second opposing electrode,
wherein the control unit implements
 a first operation of forming a first voltage distribution along the first intersecting direction by applying a first voltage between the first elongated electrodes and the first opposing electrodes, and
 a second operation of forming a second voltage distribution by applying a second voltage between the first opposing electrodes and the second opposing electrode, a period of voltage fluctuation of the second voltage distribution being shorter than a period of voltage fluctuation of the first voltage distribution.

2. The device according to claim 1, wherein
the control unit forms, in the first operation, a first refractive index distribution along the first intersecting direction in the liquid crystal layer,
the control unit forms, in the second operation, a second refractive index distribution in the liquid crystal layer, and
the refractive index of the liquid crystal layer in the second refractive index distribution does not fluctuate, or the fluctuation of the refractive index of the liquid crystal layer in the second refractive index distribution is smaller than the fluctuation of the refractive index of the liquid crystal layer in the first refractive index distribution.

3. The device according to claim 1, wherein
the second opposing electrode is provided in a plurality,
each of the plurality of second opposing electrodes extends in the second direction, and
center of each of the plurality of first opposing electrodes in the second intersecting direction and center of each of the plurality of second opposing electrodes in the second intersecting direction are arranged alternately along the second intersecting direction.

4. The device according to claim 3, wherein
the first substrate unit further includes a plurality of second elongated electrodes provided on the first surface to extend in the first direction,
the first opposing electrodes and the second opposing electrodes are arranged alternately along the first intersecting direction, the third operation includes causing an absolute value of a potential difference between the second elongated electrodes and the first opposing electrodes to be less than an absolute value of a potential difference between the first elongated electrodes and the first opposing electrodes, and the third operation includes causing an absolute value of a potential difference between the second elongated electrodes and the second opposing electrodes to be less than an absolute value of a potential difference between the first elongated electrodes and the second opposing electrodes.

5. The device according to claim 3, wherein
the first substrate unit further includes a plurality of second elongated electrodes provided on the first surface to extend in the first direction,
the first opposing electrodes and the second opposing electrodes are arranged alternately along the first intersecting direction,
the control unit is further electrically connected to the second elongated electrodes, and
the first operation includes causing an absolute value of a potential difference between the second elongated electrodes and the first opposing electrodes to be less than an absolute value of a potential difference between the first elongated electrodes and the first opposing electrodes.

6. The device according to claim 1, wherein the second substrate unit further includes a second substrate insulating layer provided between the first opposing electrodes and the second opposing electrode to electrically insulate the first opposing electrodes from the second opposing electrode.

7. The device according to claim 1, wherein
the second substrate unit further includes:
a plurality of third opposing electrodes provided between the first substrate unit and the second substrate, arranged with the first opposing electrodes in the second direction, provided to extend in the second direction, and arranged in the second intersecting direction at a third pitch smaller than the first pitch; and
a plurality of fourth opposing electrodes provided between the first substrate unit and the second substrate, the fourth opposing electrodes including a portion not overlapping the third opposing electrodes when projected onto the plane,
at least a portion of each of the plurality of third opposing electrodes is not covered with the fourth opposing electrodes,
the first elongated electrodes includes a first group and a second group different from the first group,
the control unit is further electrically connected to the third opposing electrodes and the fourth opposing electrodes,
the control unit implements a third operation of
setting the first elongated electrodes of the first group to have a first group potential,
setting the first elongated electrodes of the second group to have a second group potential,
setting the first opposing electrodes to have a first opposing potential,
setting the second opposing electrode to have a second opposing potential,
setting the third opposing electrodes to have a third opposing potential, and
setting the fourth opposing electrodes to have a fourth opposing potential,
the second group potential is between the first group potential and the first opposing potential, between the first group potential and the second opposing potential, and between the third opposing potential and the fourth opposing potential, an absolute value of a difference between the first opposing potential and the second opposing potential is less than an absolute value of a difference between the third opposing potential and the fourth opposing potential, and an absolute value of a difference between the first group potential and an average potential of the third opposing potential and the fourth opposing potential is less than an absolute value of a difference between the first group potential and the first opposing potential and less than an absolute value of a difference between the first group potential and the second opposing potential.

8. The device according to claim 7, wherein the absolute value of the difference between the third opposing potential and the fourth opposing potential is greater than an absolute value of a difference between the second group potential and the first opposing potential and greater than an absolute value of a difference between the second group potential and the second opposing potential.

9. The device according to claim 7, wherein the third operation includes setting one selected from the third opposing potential and the fourth opposing potential to be between the second group potential and the first opposing potential and between the second group potential and the second opposing potential.

10. The device according to claim 7, wherein the third operation includes setting the second opposing potential to be same as the first opposing potential.

11. The device according to claim 7, wherein the third operation includes rotating, in the plane, the alignment direction of the liquid crystal included in at least one selected from a portion of the liquid crystal layer between the first group and the third opposing electrodes and a portion of the liquid crystal layer between the first group and the fourth opposing electrodes.

12. The device according to claim 7, wherein
the liquid crystal layer includes:
a first liquid crystal portion between the first group and the first opposing electrodes and between the first group and the second opposing electrode;
a second liquid crystal portion between the first group and the third opposing electrodes and between the first group and the fourth opposing electrodes;
a third liquid crystal portion between the second group and the first opposing electrodes and between the second group and the second opposing electrode; and
a fourth liquid crystal portion between the second group and the third opposing electrodes and between the second group and the fourth opposing electrodes, and
a fluctuation of a refractive index of the first liquid crystal portion in the third operation is larger than a fluctuation of a refractive index of the second liquid crystal portion in the third operation, larger than a fluctuation of a refractive index of the third liquid crystal portion in the third operation, and larger than a fluctuation of a refractive index of the fourth liquid crystal portion in the third operation.

13. The device according to claim 7, wherein
each of the fourth opposing electrodes extends in the second direction, and
a center of each of the third opposing electrodes in the second intersecting direction and a center of each of the fourth opposing electrodes in the second intersecting direction are arranged alternately along the second intersecting direction.

14. The device according to claim 7, wherein the second substrate unit further includes a connection unit extending in the second intersecting direction to link ends of each of the third opposing electrodes.

15. The device according to claim 1, wherein the second substrate unit further includes a connection unit extending in the second intersecting direction to link ends of each of the first opposing electrodes.

16. The device according to claim 1, wherein an absolute value of an angle between the alignment direction and a direction parallel to the plane and perpendicular to the second direction is greater than an absolute value of an angle between the alignment direction and a direction parallel to the plane and perpendicular to the first direction.

17. The device according to claim 1, wherein each of the first opposing electrodes has a width in the second intersecting direction not less than ¼ of the second pitch.

18. The device according to claim 1, wherein the second pitch is not less than 0.05 times and not more than 0.25 times the first pitch.

19. An image display device, comprising:
the liquid crystal optical device according to claim 1; and
an image display unit stacked with the optical unit,
wherein the image display unit causes light including image information to be incident on the optical unit.

20. The image display device according to claim 19, wherein
the second substrate unit further includes:
a plurality of third opposing electrodes provided between the first substrate unit and the second substrate, arranged with the first opposing electrodes in the second direction, provided to extend in the second direction, and arranged in the second intersecting direction at a third pitch smaller than the first pitch; and
a fourth opposing electrode provided between the first substrate unit and the second substrate, the second opposing electrode including a portion not overlapping the third opposing electrodes when projected onto the plane,
at least a portion of each of the third opposing electrodes is not covered with the fourth opposing electrode,
the first elongated electrodes includes a first group and a second group different from the first group,
the control unit implements a third operation of
setting the first elongated electrodes of the first group to have a first group potential,
setting the first elongated electrodes of the second group to have a second group potential,
setting the first opposing electrodes to have a first opposing potential,
setting the second opposing electrode to have a second opposing potential,
setting the third opposing electrodes to have a third opposing potential, and
setting the fourth opposing electrode to have a fourth opposing potential,
the second group potential is between the first group potential and the first opposing potential, between the first group potential and the second opposing potential, and between the third opposing potential and the fourth opposing potential,
an absolute value of a difference between the first opposing potential and the second opposing potential is less than an absolute value of a difference between the third opposing potential and the fourth opposing potential,
an absolute value of a difference between the first group potential and an average potential of the third opposing potential and the fourth opposing potential is less than an absolute value of a difference between the first group potential and the first opposing potential and less than an absolute value of a difference between the first group potential and the second opposing potential,
the liquid crystal layer includes:
a first liquid crystal portion between the first group and the first opposing electrodes and between the first group and the second opposing electrode;
a second liquid crystal portion between the first group and the third opposing electrodes and between the first group and the fourth opposing electrode;
a third liquid crystal portion between the second group and the first opposing electrodes and between the first group and the second opposing electrode; and
a fourth liquid crystal portion between the second group and the third opposing electrodes and between the first group and the fourth opposing electrode,
a fluctuation of a refractive index of the first liquid crystal portion in the third operation is larger than a fluctuation of a refractive index of the second liquid crystal portion in the third operation, larger than a fluctuation of a refractive index of the third liquid crystal portion in the third operation, and larger than a fluctuation of a refractive index of the fourth liquid crystal portion in the third operation,
a three-dimensional image is displayable by light being emitted from the image display unit to pass through the first liquid crystal portion, and
a two-dimensional image is displayable by light being emitted from the image display unit to pass through the second, third, and fourth liquid crystal portions.

* * * * *